United States Patent
Räisänen

(10) Patent No.: US 6,977,942 B2
(45) Date of Patent: Dec. 20, 2005

(54) METHOD AND A DEVICE FOR TIMING THE PROCESSING OF DATA PACKETS

(75) Inventor: Vilho Räisänen, Helsinki (FI)

(73) Assignee: Nokia Corporation, Espoo (FI)

( * ) Notice: Subject to any disclaimer, the term of this patent is extended or adjusted under 35 U.S.C. 154(b) by 777 days.

(21) Appl. No.: 09/749,055

(22) Filed: Dec. 27, 2000

(65) Prior Publication Data

US 2001/0012300 A1 Aug. 9, 2001

(30) Foreign Application Priority Data

Dec. 30, 1999 (FI) .................................. 19992834

(51) Int. Cl.[7] .............................................. H04L 12/54
(52) U.S. Cl. ....................... 370/429; 370/235; 370/412
(58) Field of Search ................................ 370/429, 469, 370/516, 352, 218, 252, 556, 349, 394, 235, 370/395.4, 412, 509, 428, 236, 231, 238, 370/508, 517, 519; 709/214, 231

(56) References Cited

U.S. PATENT DOCUMENTS

| | | | | |
|---|---|---|---|---|
| 5,963,551 A | * | 10/1999 | Minko | 370/356 |
| 6,085,252 A | * | 7/2000 | Zhu et al. | 709/231 |
| 6,219,339 B1 | * | 4/2001 | Doshi et al. | 370/235 |
| 6,259,677 B1 | * | 7/2001 | Jain | 370/252 |
| 6,259,691 B1 | * | 7/2001 | Naudus | 370/352 |
| 6,282,196 B1 | * | 8/2001 | Lyons et al. | 370/394 |
| 6,301,258 B1 | * | 10/2001 | Katseff et al. | 370/412 |
| 6,304,567 B1 | * | 10/2001 | Rosenberg | 370/356 |
| 6,360,271 B1 | * | 3/2002 | Schuster et al. | 709/231 |
| 6,366,959 B1 | * | 4/2002 | Sidhu et al. | 709/231 |
| 6,400,681 B1 | * | 6/2002 | Bertin et al. | 370/218 |
| 6,434,606 B1 | * | 8/2002 | Borella et al. | 709/214 |
| 6,452,950 B1 | * | 9/2002 | Ohlsson et al. | 370/516 |
| 6,483,835 B1 | * | 11/2002 | Tanigawa et al. | 370/395.21 |
| 6,512,761 B1 | * | 1/2003 | Schuster et al. | 370/352 |
| 6,570,849 B1 | * | 5/2003 | Skemer et al. | 370/230.1 |
| 6,574,213 B1 | * | 6/2003 | Anandakumar et al. | 370/349 |

(Continued)

FOREIGN PATENT DOCUMENTS

EP 0921666 A3 6/1999

(Continued)

OTHER PUBLICATIONS

"Adaptive Playout Mechanisms For Packetized Audio Applications in Wide-Area Networks", Ramjee et al., IEEE 1994.

*Primary Examiner*—Brian D. Nguyen
(74) *Attorney, Agent, or Firm*—Perman & Green, LLP.

(57) ABSTRACT

A method and a device for timing the processing of data packets, which method comprises receiving a data packet that is part of a data burst, storing the received data packet in a memory (53), taking the data packet from the memory after a play-out delay from the moment the data packet was received, calculating a value for the play-out delay with which value, of the n temporally last data packets only m pieces would have failed to be received if the initiation of the processing of the data bursts comprising the data packets in question had been delayed for the duration of said play-out delay, where n and m are natural numbers, and transferring the data packet from the memory to processing means (38) on the basis of a response obtained from a clock (54) of the reaching of said play-out delay value from the moment the data packet was received.

17 Claims, 6 Drawing Sheets

U.S. PATENT DOCUMENTS

| | | | |
|---|---|---|---|
| 6,584,104 B1 * | 6/2003 | McGowan | 370/394 |
| 6,665,317 B1 * | 12/2003 | Scott | 370/516 |
| 6,704,329 B2 * | 3/2004 | Martin | 370/516 |
| 2004/0066751 A1 * | 4/2004 | Tseng et al. | 370/252 |

FOREIGN PATENT DOCUMENTS

| | | |
|---|---|---|
| WO | WO 95/22233 | 8/1995 |
| WO | WO 00/42479 | 7/2000 |

* cited by examiner

METHOD AND A DEVICE FOR TIMING THE PROCESSING OF DATA PACKETS

FIELD OF THE INVENTION

The present invention relates to a method and a device for timing the processing of data packets.

BACKGROUND OF THE INVENTION

Conventionally, when calling by telephone speech has been transferred in circuit-switched networks, such as in a Public Switched Telephone Network (PSTN). When calling by telephone in a digital circuit-switched network, a (permanent) connection of 64 kbps (kilo bits per second) is established for each call. The constant band of a connection, 64 kbps, is due to the bit rate required in the sampling of analog speech when using 8-bit Pulse Code Modulation (PCM) at a sampling frequency of 8 kHz, which procedure enables the transmitting of analog speech of 300–3400 Hz in a digital format.

The digital telephone network presented above which is currently in common use is, however, very ineffective and, thus, uses a lot of the network's resources. In the telephone network, the band of a connection is also reserved when the connection is not actively used, i.e. neither party of the connection is transferring information along the connection. This kind of use of a static band consumes a lot of data transmission resources as a result of which as the number of users increases, additional capacity must be invested in. In addition, the band is also wasted due to the ineffective Coding Scheme standardised in the telephone network. For example, G.729-coding manages sampling even at such a low bit rate as 8 kbps. Problems result from the kind of ineffectiveness described above particularly in calls between continents, where the increasing of data transmission capacity is not as easy as it is otherwise. The problem also manifests itself partly in the prices of calls; expensive investments in the capacity must be covered by high use charges.

In particular, for connections between countries, instead of a static band reservation, so-called IP (Internet Protocol Telephony) calls have been started to be marketed. In an IP call, speech is converted first from an analog format into a digital format, it is compressed and finally converted into IP packets that are conveyed over an IP network sharing a band with the rest of IP traffic. In IP calls, a band can be used considerably more effectively than in calls that reserve a static band, which also shows in the prices of calls. Furthermore, also new more effective coding procedures can be used, such as, e.g. G.729-coding.

In IP calls, a user can make a call by an ordinary telephone through a gateway to another ordinary telephone. The gateway delivers the call to the gateway of a receiver through an IP-based data network, such as, the Internet, from where the call is further directed through the receiver's local telephone network to the receiver. In the gateway of the receiver, the call is connected back to a public switched telephone network. A second alternative is the user being in a non-switched network connection to an IP-based data network, for example, through a local area network, whereupon user does not have to open a static audio band to a telephone network at all, but a router behind which user is, can route calls to the receiver in a manner of normal packet-based data transmission. IP calls are based on an Internet protocol with the help of which speech is transferred as packets over an IP network. This means that IP calls can be transferred, in principle, in any data network that uses IP protocol, for example, in the Internet, Intranets or local area networks.

In IP calls, however, the Quality of Service (QoS) becomes a problem. The time of arrival of IP packets to a receiver is not known before the packets arrive. IP protocol routes the data flow packet-specifically due to which the delay of the packets in a network may vary greatly and the order of the packets may change. In addition, packets may be lost, for example, as a result of incoming data over flow that occur in the buffers of the routers. By using a reliable protocol, such as TCP (Transmission Control Protocol), packet losses like this can be identified automatically at the protocol level and the lost packets can be re-transmitted. However, the types of re-transmissions in question would continue to cause a varying delay as the packets pass through the network, so in IP calls UDP (User Datagram Protocol) protocol is normally used, where there are no re-transmissions. Thus, speech easily becomes fragmentary and incoherent as the delays between the packets grow although not a single packet would be lost on the way.

A solution to this problem is presented, for example, in the publication Ramjee R., Kurose K., Towsley D. 1994. Adaptive Playout Mechanism for Packetized Audio Applications in Wide-Area Networks., where incoming packet-based audio (speech) data is buffered and the initiation of the calling of a uniform audio (speech) burst comprising a plurality of packets is delayed. A short-term delay trend calculated from the delay values of the packets that came in last, i.e. a moving average calculated from the delay values, is utilised in the determination of the length of the delay.

However, such direct end-to-end delay management as this is, is not generally sufficient, for example, for ensuring the quality of an interactive real-time data stream. It is not sufficient to merely determine the delay so that only, for example, one per cent of the packets is lost, as in the model described above. It is also important to take into account the correlation between the lost packets, i.e. the so-called loss correlation. It is highly important as regards the quality of the connection whether packets are lost one here, another one there (no loss correlation) or several one after another (high loss correlation). The importance of loss correlation depends on the codec used because, for example, the codec used in a VoIP (Voice over Internet Protocol) terminal, e.g. G.723.1, could be able to cover the loss of two successive packets by using Forward Error Correction (FEC), where the loss of three successive packets might cause an audible error. In this case, the method used should indeed be able to also take into consideration loss correlations of packets when deciding on the delay. However, the method reflecting prior art for buffer management does not take into account loss correlations between packets.

SUMMARY OF THE INVENTION

Now, a method and a device have been invented for timing the processing of data packets, which improves, for example, the quality of speech of a real-time packet-based audio connection by also taking into consideration loss correlations between packets.

According to a first aspect of the invention, a device has been implemented for timing the processing of data packets, comprising a memory for storing a data packet that comes to the device as part of a data burst, a clock for determining the course of time, and processing means for processing the data packet that exits the memory, characterised in that the device further comprises calculating means for calculating such a value for a play-out delay with which value, of the n temporally most recent data packets only m pieces would have failed to be received if the initiation of the processing of the data bursts comprising the data packets in question had been delayed for the duration of said play-out delay, where n and m are natural numbers, and transferring means for transferring the packets from the memory to the processing means on the basis of a response obtained from the clock of the reaching of said play-out delay value from the moment the data packet was received.

According to a second aspect of the invention, a method has been implemented for timing the processing of data packets, the method comprising receiving a data packet that is part of a data burst, storing the received data packet in a memory, taking the data packet from the memory after a play-out delay from the receiving of the data packet, characterised in that the method comprises calculating a value for the play-out delay with which value of the play-out delay, of the n temporally most recent data packets only m pieces would have failed to be received if the initiation of the processing of the data bursts comprising the data packets in question had been delayed for the duration of said play-out delay, where n and m are natural numbers, and transferring the data packet from the memory to the processing means on the basis of a response obtained from the clock of the reaching of said play-out delay value from the receiving of the data packet.

By the data burst is meant, in this connection, the continuous uninterrupted transmitting of bursty information, such as speech or video. Thus, the duration of a data burst is, for example, equal to the length for which a sender, for example, speaks continuously and thus, when the sender pauses while he is speaking, the data burst also stops. Different types of data bursts are, for example, an audio (speech) burst wherein bursty audio information is transmitted, and a video burst wherein bursty video picture is transmitted. Hence, even a high number of data packets may belong to a data burst, by which data packets is here understood primarily a digital sample taken from analog information, such as speech and picture. Whereas, in the following, by a data frame is understood, for example, when transmitting in an IP-based data network, a uniform entity placed around a packet/data packets formed of a header field and the data packet/data packets.

The device and method according to the invention are based on the assumptions of the limitation of the number of successive lost packets and the maximum play-out delay in the initiation of the processing of the first data packet of a data burst. The number limit of successively lost packets depends, for example, on the properties of the codec used. If the used codec is capable of correcting the loss of two successively lost data packets, the value two is used as the maximum number $l_{max}$ of the successively lost data packets, provided that there are no other factors influencing the matter. The play-out delay d again is set so that the number l of the successive lost data packets, viewed from the last n data packets received would be the maximum number $l_{max}$ of the successively lost data packets at the most, if only the maximum value $d_{max}$ of the play-out delay allows as high a play-out delay value as this.

In general, it can be said that the number of successive lost packets decreases as the value of the play-out delay increases. In an extreme case, it could be thought the play-out delay to be so large that there would be time to receive the whole data burst before the initiation of the processing of the first data packet after the play-out delay from the receiving of the data packet in question, in which case not a single data packet would be lost due to the delay.

However, as high a play-out delay value as this would wreck the full duplex, real-time and interactive nature of a connection. With high play-out delay values, the experienced Quality of Service (QoS) decreases, e.g. as the information, such as speech, transmitted by the parties that are in communication, overlaps. Determining the maximum value of the play-out delay is indeed a multi-goal optimisation task, the objective being minimising the play-out delay and the number of successively lost data packets, the solution of which normally changes as the conditions of the network change.

In other words, in the method according to the invention, a value is calculated for a play-out delay d, which is the smallest possible value for which $1 \leq l_B^{max}$ is true, however, so that $d \leq d_{max}$ is true for the play-out delay, i.e. for which value it is true that it is smaller than or equal to the maximum value of the play-out value, or the number of lost successive data packets is smaller than or equal to the maximum value of lost successive data packets, if this can be achieved with the play-out delay which is smaller than the maximum value of the play-out delay.

In the following, by the delay time of a data packet means the theoretic delay from the time of arrival of the data packet, as calculated from the arriving of the first data packet of a data burst to the device of a receiver. If k is the time of arrival of the first data packet of the data burst, and v is the sampling interval used by a sender, the theoretic time of arrival of the $n^{th}$ data packet of the data burst can be calculated from the equation the time of arrival=$k+n^*v$, to which value the realised time of arrival is then compared for calculating the delay time. When using RTP protocol, whereupon the RTP header field of a data frame contains both the time stamp and sequence number of a data packet, the theoretic time of arrival can be calculated by comparing the time stamps of the first data packet of the data burst and the data packet that is the object of calculation to each other. This approach would indeed be unconditional if, for some reason, the sampling interval used by the sender was not constant within the data burst.

In a preferred embodiment of the invention, the device and method are used in a network call for managing the delays of the data packets of data bursts. With the method according to the invention, the initiation of the processing of the first data packet of a data burst is delayed so much that estimated from the delay times of the data packets of the already arrived previous data bursts, of the n last already arrived data packets, a group of the length of m successive data packets at a maximum would have failed to arrive within the play-out delay. The device according to the invention can be a separate network telephone, a network videophone, a wireless telephone or other corresponding one, or it can utilise a processor, a microphone, speakers, a video card of a computer, etc. whereupon no separate device would be required in its implementation in practice, but it could be implemented programmably making use of the equipment commonly found in modern computers.

With the invention, a reasonably easy and simple method and device are produced for timing the processing of data packets. The invention is particularly usable in real-time interactive communication through a data network, such as, e.g. the Internet. With the invention, it is possible to adapt more effectively than before at the receiving end to problems due to delays of varying lengths caused by stochastic network conditions and, thus, to improve the experienced Quality of Service (QoS). This is achieved, as distinct from the former, by taking into consideration in addition to the mere delays of data packets, also loss correlations between data packets that have not arrived, which may significantly influence the experienced Quality of Service.

BRIEF DESCRIPTION OF THE DRAWINGS

In the following, the invention will be described in detail by referring to the enclosed drawings, in which.

DETAILED DESCRIPTION

Figure 1:
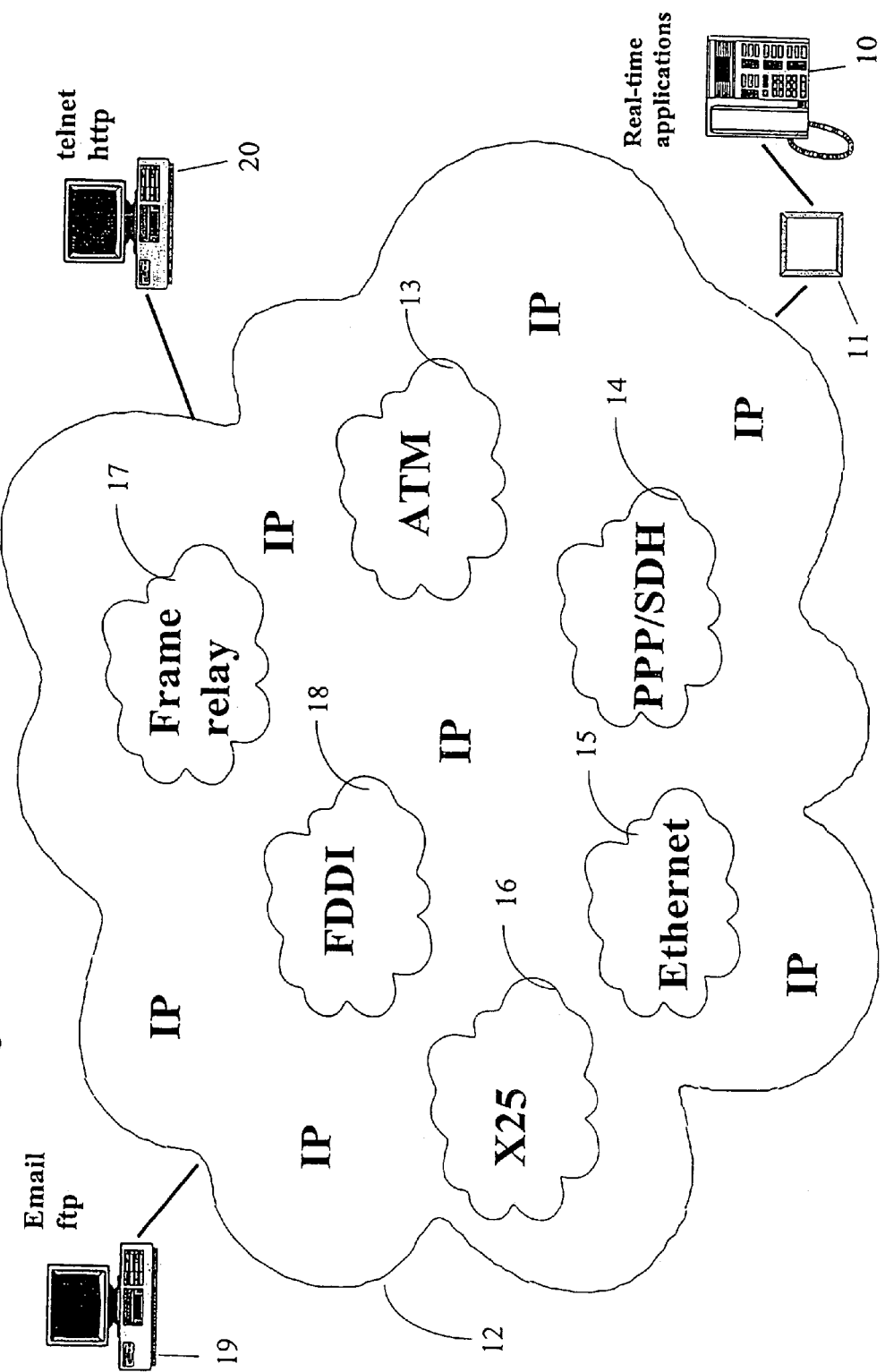
FIG. 1 shows in general, as a block diagram, an operating environment according to the invention.

FIG. 1 shows in general a preferred operating environment of a device according to an embodiment of the invention, as a block diagram. The operating environment comprises a terminal 10 that uses real-time applications, such as, e.g. VoIP or packet-based video, which terminal can be, for example, a VoIP phone, a videophone, a real-time interactive video conference application of a computer, etc. The terminal 10 is through an adapter 11 that may consist of, e.g. a gateway located in a Public Switched Telephone Network (PSTN), connected with an IP-based network 12 (IP cloud, Internet Protocol), such as, e.g. the Internet. The Internet is, in a simplified manner, a network formed of different networks, that supports TCP/IP-based applications, such as, e.g. WWW (World Wide Web), SMTP (Simple Mail Transfer Protocol) email or FTP (File Transfer Protocol). The sub-networks that form the Internet can be, for example, ATM—13 (Asynchronous Transfer Mode), PPP/SDH—14 (Point-to-Point Protocol/Synchronous Digital Hierarchy), Ethernet—15 (see, e.g. the standard IEEE 802.3), X25—16 (standard of ITU-T), FR—17 (Frame Relay), or FDDI-based 18 (Fiber Distributed Data Interface) networks. Attached to the Internet are users who use, for example, ftp- and email-based applications 19 or, for example, telnet- and http-based (Hypertext Transfer Protocol) applications 20. It will be appreciated that the operating environment according to the invention is not restricted to what was presented above but, in reality, the Internet consists of a much larger number of users and networks.

Figure 2:
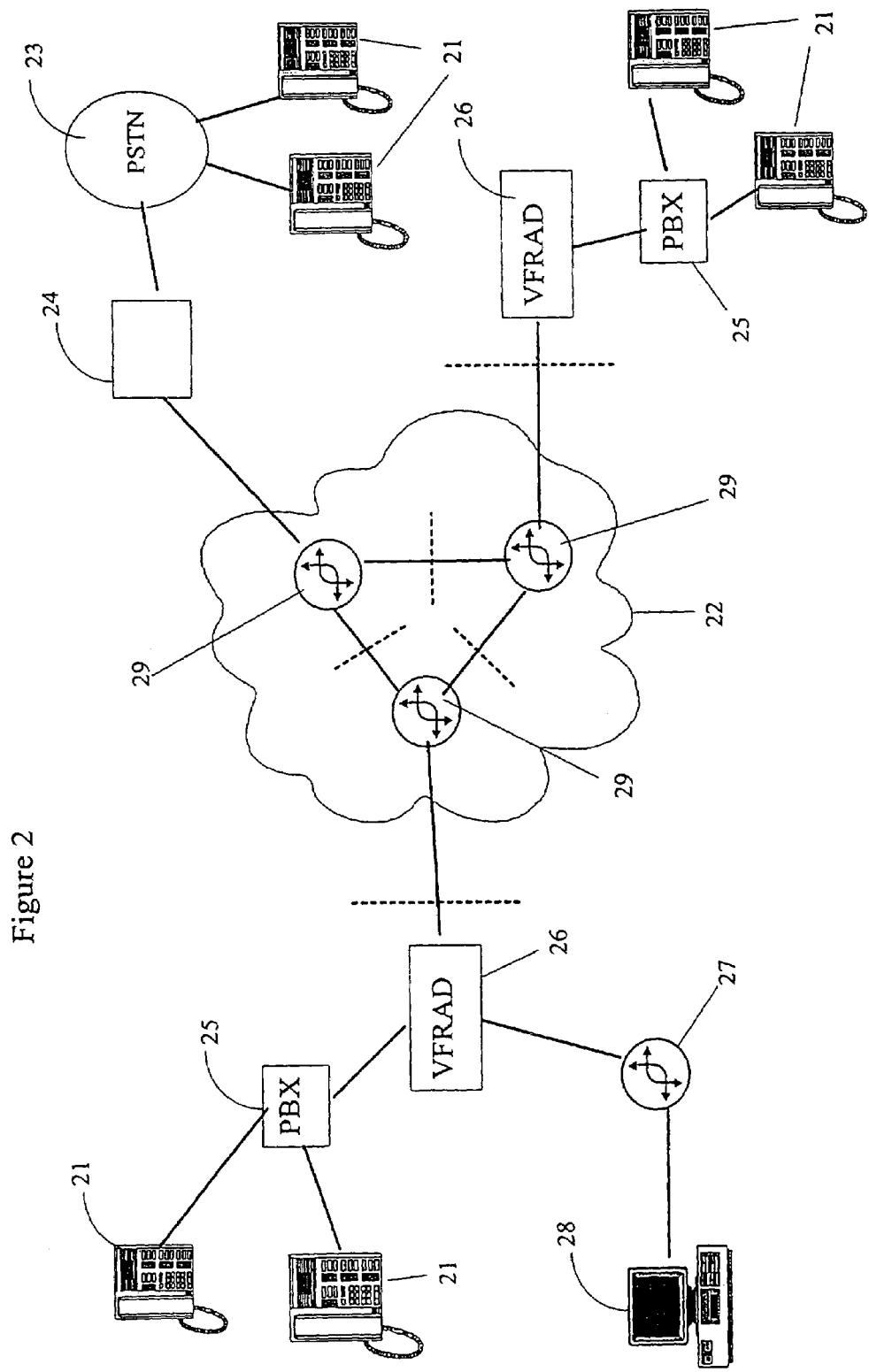
FIG. 2 shows in general as a block diagram, an architecture of a preferred operating environment according to the invention.

FIG. 2 shows in general as a block diagram a preferred operating environment architecture (VOFR architecture) (Voice over Frame) of a device according to the invention, which operating environment comprises terminals 21 that utilise real-time applications and routers 29 that cause delays in the real-time data transmission between the terminals. The terminals 21 are attached to an ATM-based FR network 22, either through a Public Switched Telephone Network (PSTN) 23 along a gateway 24 or when the terminals are in a direct network connection, through a PBX 25 (private branch exchange) to a VFRAD device 26 (Voice Frame Delay Access Device) and from there further to the FR network. The VFRAD enables the multiplexing/demultiplexing of data, voice and fax between different sources and applications and one network access point. On the other side of the VFRAD, there can also be a router 27 of a local area network and behind the router 27, a plurality of terminals 28.

Figure 3:
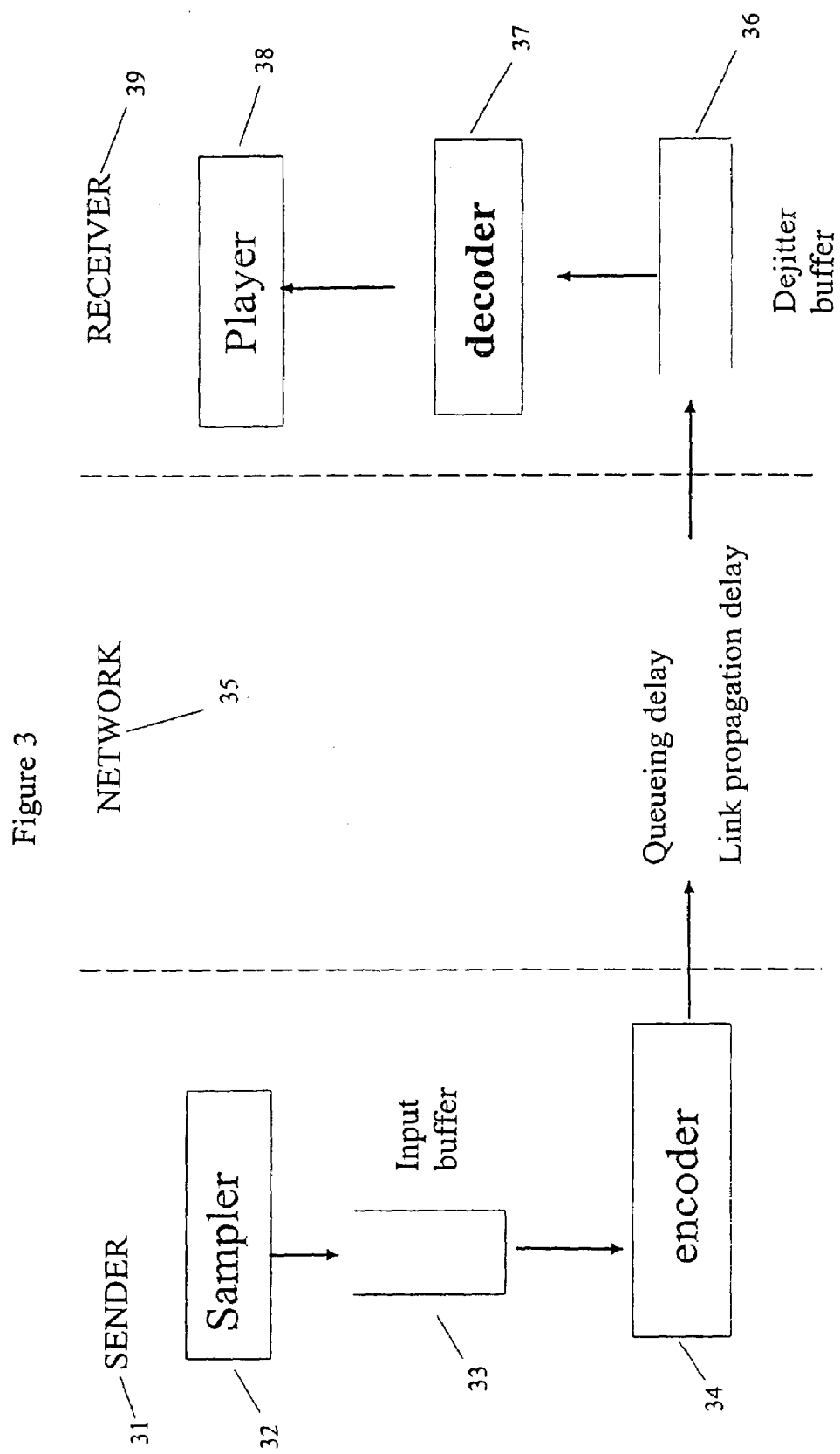
FIG. 3 shows a diagram of a preferred mode of operation of a device according to the invention, in its operating environment.

In FIG. 3, there is illustrates by means of a diagram a preferred usage of a device according to the invention, in its operating environment. The operating environment consists of two parties in a real-time interactive connection with each other over a network—a sender 31 and a receiver 39. Since it is a question of an interactive connection between two parties, it is clear that the roles of the parties as a sender and a receiver may change during the connection. The sender 31 is in a real-time interactive data transmission connection, such as in, for example, a VoIP connection with the receiver 39. Of the analog information transmitted by the sender, for example, speech, samples are taken at suitable constant intervals by a sampler 32, which is, e.g. a microphone, a digital video camera or other corresponding sampler comprising an A/D converter for converting analog information into a digital format. The obtained samples are stored in an input buffer 33 to wait for transmission packing. From the input buffer, the samples are directed to an encoder 34, which encodes them into a format transferable in the network, for example, frames them. From the encoder, the data packets are transmitted to a network 35 for being conveyed to the receiver 39. The flow of the data packets in the network is slowed down mainly due to queuing in routers 29 (in FIG. 2) and the time taken by physical propagation. The time used for physical propagation may also vary in length for different data packets, or more precisely for data frames since, at this stage, the data packets are placed inside a frame, due to, e.g. the changing of the routing table of some router in the middle of the transmitting of a data burst, which thus directs the data packets that came in after the change along a route different to that used before the updating of the routing table. From the network, the data packets are transferred into a jitter buffer 36 through IP and UDP protocol stacks which remove from the data frame the fields that correspond to the protocols in question, to wait for their processing and transfer to a decoder 37. The terminal of the receiver takes from the buffer 36 samples when specific criteria are met and transfers them to the decoder 37, wherein the data frame is unpacked, and from there further to a player 38, such as, e.g. an audio playing application, video processing application of a computer, a combination of the D/A converter and speaker of a public switched telephone or other corresponding application comprising a D/A converter, for being converted from a digital format back into an analog format, for being processed and, thus, presented to the receiver.

Figure 4:
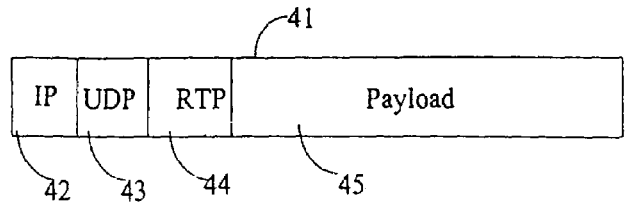
FIG. 4 shows in general a data frame used in the data transmission of real-time data in IP-based data networks.

FIG. 4 shows in general a data frame 41 used in the data transmission of real-time data in IP-based data networks. The data frame comprises an IP header field 42, which comprises in general mainly information on the IP address of the sender and the receiver. After the IP header field, there follows, for example, a UDP header field 43 in the case of UDP-based data transmission, which is generally used by audio (speech) and video data transferred in an IP network. The UDP header field comprises information on the numbers of the ports of the sender and the receiver, and if desired, an additional data field checksum can be added to the field. The UDP header field is followed by an RTP header field 44, which comprises information, for example, on which application of the receiver the data packet is question is going to and information on how the data packet in question places itself in the data stream transferred to the same application, i.e. the sequence number of the data packet. The RTP header field is followed by an actual data packet 45 or a plurality of data packets transferred over the data network.

Figure 5:
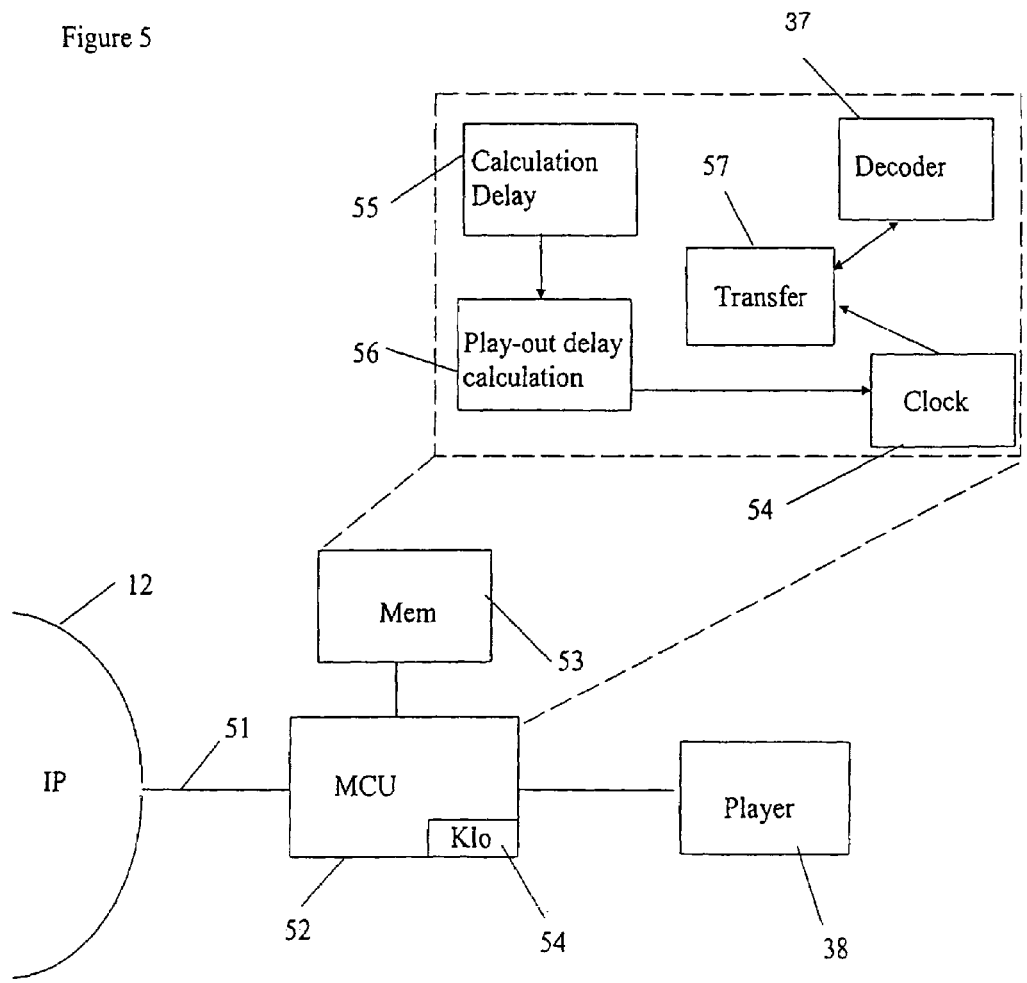
FIG. 5 shows as a block diagram a description of a device according to the invention for timing the processing of data packets.

FIG. 5 shows as a block diagram the description of a device according to the invention for timing the processing of data packets. The device comprises a telecommunication connection 51 to an IP-based data network 12, which telecommunication connection can be implemented, for example, through a public telephone network and a gateway, directly through a local network or through a wireless connection to the data network. Along the telecommunication connection 51, information is transferred to the device in data packets 45 that arrive inside data frames 41. The information arriving in the data packets is received in a Master Controlling Unit 52 (MCU), which is, for example, a microprocessor. The Master Controlling Unit is arranged, on the basis of a program stored in a memory 53, to store the data packet or data packets that arrived in the data frame in the memory 53. Lower down, the figure shows the physical block diagram of the Master Controlling Unit 52 and father up, the figure shows inside a dashed line the functional block diagram of the Master Controlling Unit 52. The Master Controlling Unit further comprises a clock 54, example, the clock of a microprocessor for determining the course of time and functions implemented with programs stored in the memory 53 for calculating 55 the delay of a data packet from the difference between the time of transmission and the time of arrival and for calculating 56 a play-out delay on the basis of the delay values of the last n data packets. The Master Controlling Unit is arranged, on the basis of a program stored in the memory 53, to unpack the data frame with a decoder application on the basis of a response obtained from the clock. In addition, a transfer function 57 is stored in the memory for transferring data packets to the Master Controlling Unit for being processed and for being presented to the user by a player 38 on the basis of a response obtained from the clock of the reaching of a specific time limit.

Figure 6:
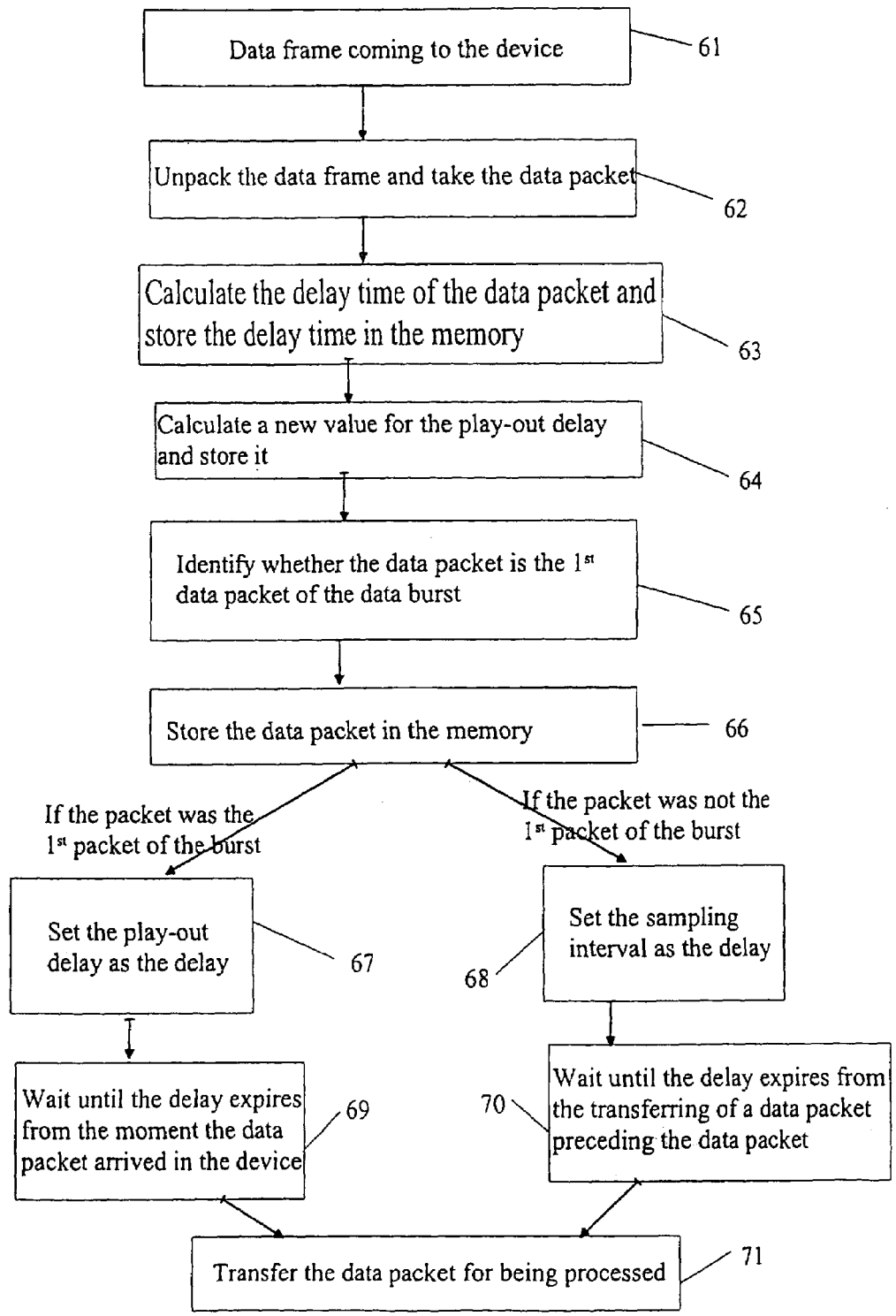
FIG. 6 describes by means of a flow diagram a preferred mode of operation of a method according to the invention.

FIG. 6 represents with a flow diagram one preferred mode of operation of the method according to the invention, in which method a data frame 41 comes from a data network along a telecommunication connection to a device (step 61). In the device, the data frame is unpacked, i.e. the header fields comprised by the data frame are removed and the data packet itself is stored (step 62). On the basis of the data obtained from the data packet the delay time of the data packet in question, i.e. the play-out delay with which the voice sample contained by the packet could have been utilise is calculated and this delay time is stored in a memory, wherein the delay times of the n last arrived data packets are stored (step 63), where n is a natural number. A new value is calculated for the play-out delay on the basis of the updated last n delay times, with which play-out delay value, of the last n data packets arrived, a queue of m successive data packets at a maximum would have failed to arrive in time when delaying the initiation of the processing of the first data packet of a data burst for the duration of the play-out delay from its arrival and when processing the data packets following the first data packet of the data burst at sampling intervals after the processing of the first data packet (step 64). The value m mentioned above can preferably be, for example, 2 and said value n can preferably be, for example, of the order of some tens.

In the special case, where a data packet is the first data packet of the whole connection in question, whereupon there exists no information on the delay times of the earlier data packets of the connection, an initial guess value is set as the value of the play-out delay, which preferably is, for example, the last play-out value used in the device at the previous occasion or some kind of other guess value, for example, on the basis of the factory settings.

After the calculation procedures of new values, it is further identified whether the data packet is the first data packet of a new data burst, such as, e.g. an audio (speech) burst or a video burst or whether it is a question of a data packet following the first data packet of the data burst (step 65). After this, the data packet in question is stored in the memory of the device to wait for the data packet in question to be transferred for being processed (step 66). Of course, in case the processing time of the data packet in question has already passed the data packet is not stored but the delay time of the data packet is.

The steps 63–65 described above can also be preferably carried out in an order different from the one described above without problems and, thus, also these modes of implementation belong to the scope of the method according to the invention.

If the data packet was the first data packet of a new data burst, said calculated new value of the play-out delay is set as the delay time monitored by the clock, calculated from the time the data packet in question arrived in the device (step 67). If the data packet was not the first data packet of the data burst, the sampling interval of the sender is set as the delay time monitored by the clock which normally, but not necessarily, is constant, starting the calculation from the transferring of the data packet preceding the data packet in question for being processed (step 68). For example, in an audio (speech) burst, the first data packet of the burst can be delayed for as long as desired without the quality of the audible speech suffering, however, with long delays real-time full duplexity would be lost, so there exists a maximum value for the delay value. However, the data packets following the first data packet of the data burst can no longer be delayed, but they must be processed or not be processed in case they have not arrived by a specific time, at specific intervals from each other. This interval is equal to the sampling interval at the sender's end of the connection. For example, in the case of speech, the delaying of others than the first data packet by deviating from the constant delay would be noticed as the "dragging" of speech when calling the receiver or correspondingly, the too fast playing of data packets would be noticed as speech faster than normal and sounding different. In both situations, the Quality of Service known to the receiver would suffer as the audio sample separation differs from the sampling interval. The type of effect described above can also be easily noticed, for example, with a videotape recorder by slowing down the processing of the information stored on a videotape in the videotape recorder by pressing the (play) deceleration selector or correspondingly, by accelerating the processing of the information of the videotape.

After setting the delay times, it is waited until the set delay time is fulfilled. In the case of the first data packet of the data burst, it is waited that the play-out delay from the arrival of the data packet in question in the device is reached (step 69). In the case of other data packets of the data burst, it is waited that a time of the length of the sampling interval is reached from the transferring of the data packet preceding the data packet in question, or from the moment the temporally most recent data packet should have been transferred but failed, for example, to arrive within its transfer time and, thus, was not however transferred, for being processed (step 70).

When the play-out delay, in case the data packet is the first data packet of the data burst, or when the sampling interval, in case the data packet is other than the first data packet of the data burst, expires, the data packet in question is transferred for being processed, for example, to the player 38 or to some other application or means (step 71).

The method described above could also be described as having two parts, whereupon the first part would be formed of the steps 61–66 and the second part would go and retrieve on the basis of the response obtained from the clock the data packet from the buffer, if the data packet had already arrived. Thus, the method would have a part that would take the information and data into the buffer and the memory, and a part that would retrieve the data and use the information stored in the memory for calculating the delays.

Figure 7:
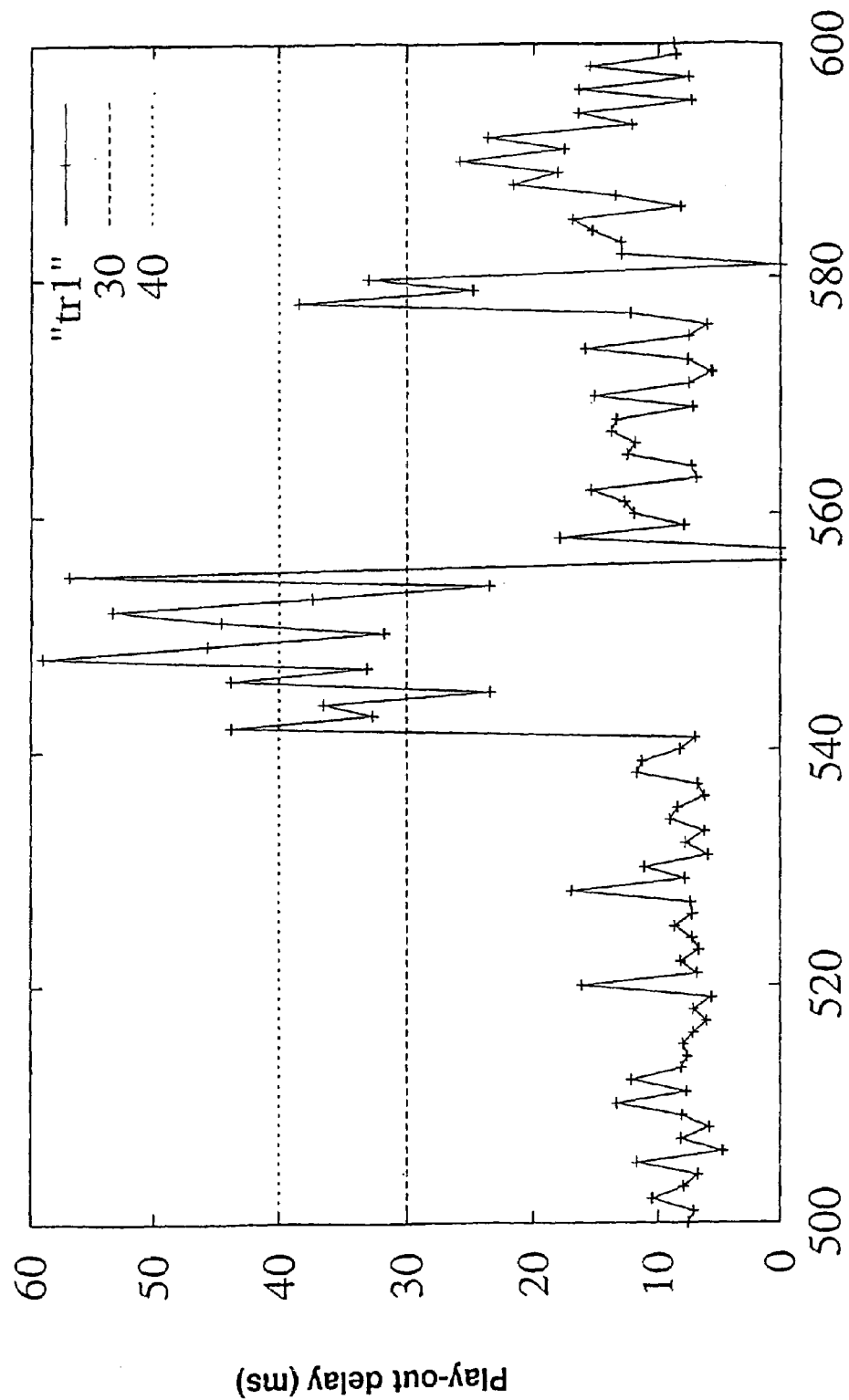
FIG. 7 shows an illustrative example of the relation between a play-out delay and the length of the queue formed of lost successive data packets.

FIG. 7 shows an illustrative example of the relation of a play-out delay to the length of the queue formed of lost successive data packets. In the figure, the vertical axis shows the value of the play-out delay used for delaying the first data packet of a data burst and, thus, of the whole data burst, in milliseconds and the horizontal axis informs the sequence numbers of the data packets of the data burst. The continuous line (marked "tr1") describes the delay of each data packet from the theoretic time of arrival calculated on the basis of the first data packet of the data burst and the sampling interval. The dashed lines (30 and 40) represent, with the play-out delay values of 30 and 40 milliseconds, whether the data packets arrive in time for being processed within the play-out delay values in question, if a data packet arrived above the dashed line, it would not have arrived in time for being processed within the delay time, and if it arrived below the dashed line, it would have arrived in time for being processed within the delay time. As is shown in the figure, the longest queue formed of successive data packets that failed to arrive within the delay time for the play-out delay value of 30 milliseconds contains eight data packets (between the sequence numbers 540–560). For the play-out delay value of 40 milliseconds, the longest queue formed of successive data packets that failed to arrive within the delay time was only eight packets long. The loss of two successive data packets could be corrected by the codec used and, thus, with the play-out value of 40 milliseconds, the loss of data packets would not be detected in the connection. In this case, on the basis of the delay times shown in the figure, 40 milliseconds could indeed preferably be selected as the value of the play-out delay.

This paper presents the implementation and embodiments of the present invention, with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A device for timing the processing of data packets, comprising a memory for storing a data packet that arrives in the device as part of a data burst, a clock for determining the course of time, and processing means for processing the data packet that exits the memory, wherein the device further comprises calculating means for calculating a value for a play-out delay with which value only m successive data packets would have failed to be received of n temporally most recent data packets if the initiation of the processing of data bursts comprising the data packets in question had been delayed for the period of said play-out delay, where n and m are natural numbers, and transferring means for transferring the packets from the memory to the processing means on the basis of a response obtained from the clock of the reaching of said play-out delay value from the moment the data packet was received, wherein the device further comprises a maximum value determined for the play-out delay and when the value of said play-out delay is higher than the maximum value determined for the play-out delay, the device is arranged to use the maximum value of the play-out delay as the value of the play-out delay.

2. A device according to claim 1, wherein said data packet is the first data packet of said data burst.

3. A device according to claim 2, wherein said transferring means are arranged to transfer received data packets following the first data packet that belong to the same data burst from the memory after a delay from the moment the temporally most recent data packet was taken from the memory.

4. A device according to claim 3, wherein said delay is a sampling interval.

5. A device according to claim 1, wherein said data burst comprises real-time interactive data.

6. A device according to claim 5, wherein the data burst comprises one of the following: packet video over IP, Voice over IP, audio/video streaming over IP.

7. A device according to claim 1, wherein a duration of said data burst is equal to the time during which a sender transmits information uninterruptedly.

8. A device according to claim 1, wherein said data packets are received from a data network through a real-time connection to some other party of the data network.

9. A device according claim 1, wherein said device is a jitter buffer of a device that makes use of real-time information.

10. A method for timing the processing of data packets, which method comprises:
    receiving a data packet that is part of a data burst;
    storing the received data packet in a memory;
    taking the data packet from the memory after a play-out delay from the moment the data packet was received;
    wherein the method further comprises
    calculating a value for the play-out delay, with which value of the play-out delay, only m successive data packets would have failed to be received of n temporally most recent data packets if the initiation of the processing of data bursts comprising the data packets in question had been delayed for the duration of said play-out delay, where n and m are natural numbers; and
    transferring the data packet from the memory to a processing means on the basis of a response obtained from a clock of the reaching of said play-out delay value from a moment the data packet was received, wherein, in addition, a maximum value is determined for the play-out delay, and when the value of said play-out delay higher than the maximum value determined for the play-out delay, the maximum value of the play-out delay is used as the value of the play-out delay.

11. A method according to claim 10, wherein said data packet is the first data packet of the data burst.

12. A method according to claim 11, wherein the method comprises taking received data packets following the first data packet that belong to the same data burst from the memory after a delay from the moment the temporally most recent data packet was taken from the memory.

13. A method according to claim 12, wherein said delay is a sampling interval.

14. A method according to claim 10, wherein said data burst comprises real-time interactive data.

15. A method according to claim 14, wherein the data burst comprises one of the following: packet video over IP, Voice over IP, audio/video streaming over IP.

16. A method according to claim 10, wherein a duration of said data burst is equal to the time during which a sender transmits information uninterruptedly.

17. A method according to claim 10, wherein said data packets are received from a data network through a real-time connection to some other party of the data network.

* * * * *